Jan. 11, 1944.   D. R. STAPLES ET AL   2,339,117
CONTROL
Filed July 5, 1941   2 Sheets-Sheet 1
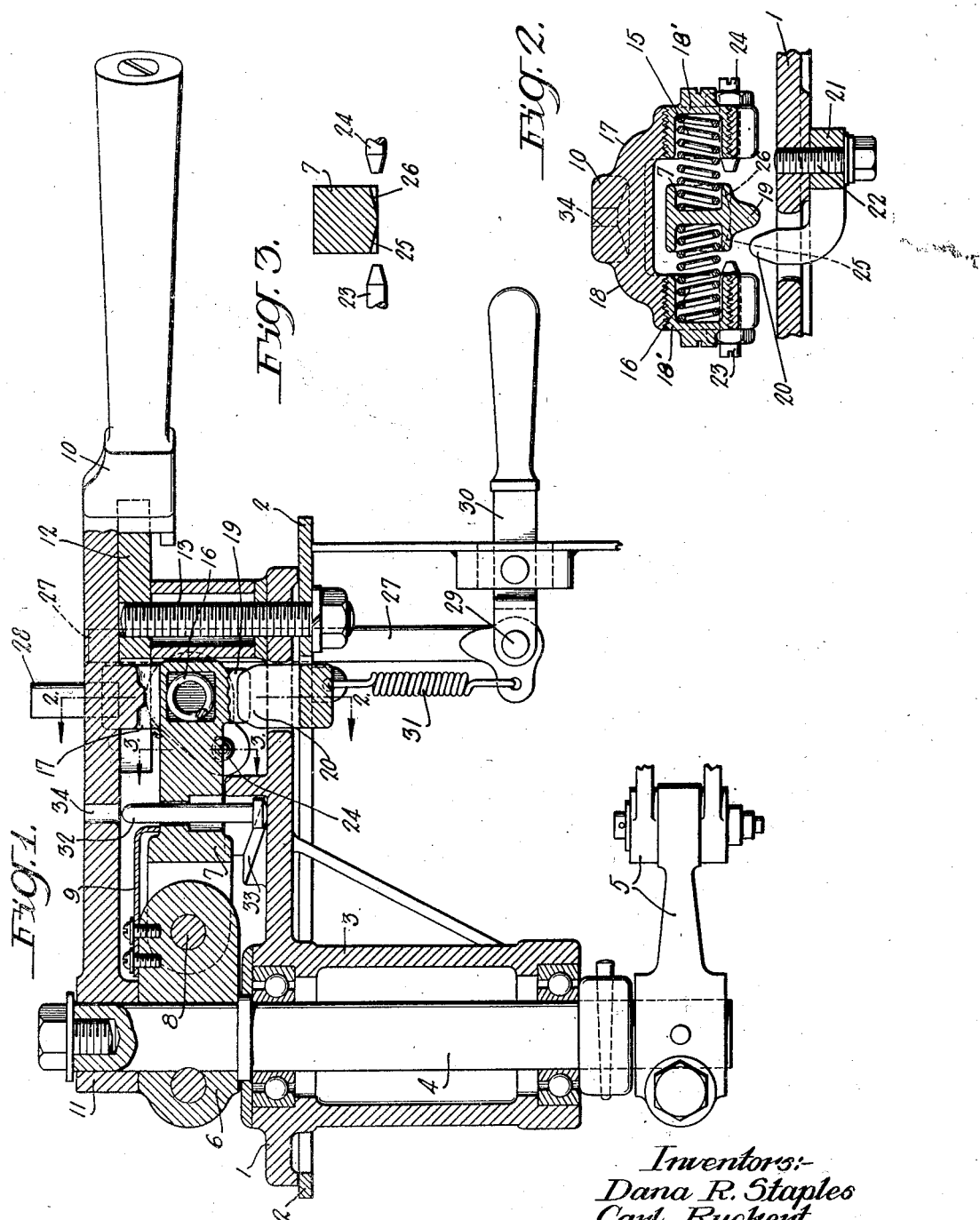
Inventors:-
Dana R. Staples
Carl Ruckert
by Edward Kirchner
their Attorney

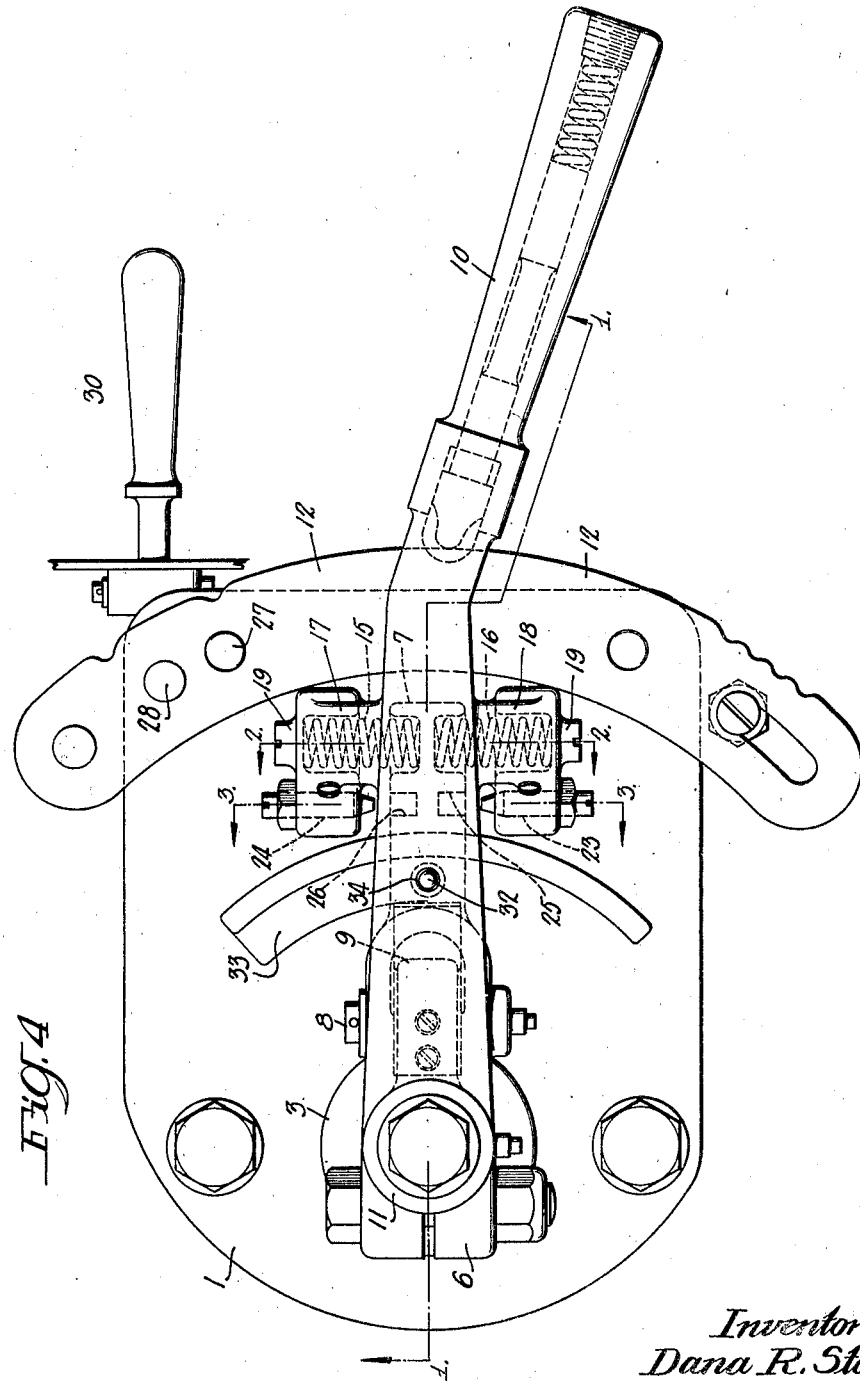

Patented Jan. 11, 1944

2,339,117

UNITED STATES PATENT OFFICE 2,339,117

CONTROL

Dana R. Staples, Ridley Park, and Carl A. Ruckert, Clifton Heights, Pa., assignors to The Baldwin Locomotive Works, a corporation of Pennsylvania Application July 5, 1941, Serial No. 401,096

11 Claims. (Cl. 74—470)

This invention relates generally to apparatus for controlling the speed of internal combustion engines and more particularly for controlling the engine in its critical speed range.

In designing an internal combustion engine to meet particular conditions of service there usually arises the problem of critical speeds. While this problem can be often considerably reduced or minimized, yet quite frequently some particular critical speed is present at which it is desirable not to operate the engine for any substantial period.

It is one object of our invention to provide improved means whereby the operator is prevented from running the engine at a particular critical speed.

Another object is to provide improved means that requires no conscious effort or thought on the part of the operator to avoid running the engine at a particular critical speed but at the same time allows him to have smooth continuous operating movement of his manual speed lever throughout its full range of movement.

A still further object is to provide an improved critical speed controller that is relatively simple and economical in construction, operation and maintenance and that is sturdy and compact combined with sensitivity and maximum flexibility of operation.

Other objects and advantages will be more apparent to those skilled in the art from the following description of the accompanying drawings in which:

Fig. 1 is a vertical sectional view taken substantially on the line 1—1 of Fig. 4;

Fig. 2 is a vertical section taken substantially on the lines 2—2 of Figs. 1 and 4;

Fig. 3 is a section taken substantially on the lines 3—3 of Figs. 1 and 4; and

Fig. 4 is a plan view of our improved control.

In the particular embodiment of the invention disclosed herein, we have shown a bracket 1 adapted to be mounted upon any suitable framework 2 of a locomotive or control box and having a housing 3 in which a governor control shaft 4 is journalled. The lower end of this shaft may be connected by suitable arms and links 5 to any usual and well-known form of engine speed governor (not shown) whereby the angular position of shaft 4 and its arm 5 will determine the speed setting of the governor and engine.

The upper end of shaft 4 has a collar 6 rigidly secured thereto so as to support a vertically movable control lever or member 7, specifically referred to herein as a governor lever, which is pivoted to collar 6 about a horizontal pin 8. A flat spring 9 biases lever 7 downwardly to the position shown in Fig. 1. Actuating means in the form of a hand operated speed lever 10 is freely journalled at 11 to the upper end of shaft 4 and is slidably supported on top of a quadrant 12 which is suitably bolted to the bracket 1 and frame 2 by a bolt, such as 13.

Hand lever 10, by reason of its freely journalled connection 11, is incapable by itself of transmitting any angular adjustment to shaft 4. However, movement of hand lever 10 is transmitted to governor lever 7 through a pair of springs 15 and 16, Fig. 2, interposed between governor lever 7 and a pair of arms 17 and 18 carried by and projecting downwardly from lever 10 on opposite sides of lever 7. To adjust the tension of springs 15 and 16 suitable threaded seat members 18' may be formed in arms 17 and 18 to receive the springs. Movement of hand lever 10 in either direction will be transmitted through springs 15 or 16 to lever 7 and accordingly angularly move shaft 4.

In order to have the engine speed pass rapidly through a critical speed and to prevent the operator from operating the engine at its critical speed, means are provided for temporarily restricting movement of governor lever 7 just before it reaches a predetermined or critical speed position even though hand lever 10 continues to be moved. After a predetermined movement of manual lever 10 beyond the critical speed position the governor lever 7 is automatically released so as to suddenly move the governor shaft 5 to a higher speed position above the critical speed. To accomplish the foregoing operation, governor lever 7, Fig. 2, is provided with a small downward stop projection 19 adapted to engage a stop 20 which projects upwardly into the path of projection 19. The stop 20 is preferably removable as by being formed on a bracket 21 secured by bolt 22 to the underside of stationary frame 1. Hence, it is seen that when stops 19 and 20 engage each other lever 7 cannot move even though hand lever 10 may continue its movement, say in a right hand direction. Such continued movement of hand lever 10 causes spring 16 to be compressed so that governor lever 7, when lifted about its pivot 8, Fig. 1, to clear stop 20 is moved continuously as well as rapidly by spring 16 to a normal central postion between the arms 17 and 18. Control lever 7 upon reaching its central position between arms 17 and 18 is then subject to further actuation by hand lever 7. This will quickly adjust the engine speed past its critical point. To raise the lever 7 a pair of cam bolts 23 and 24 are adjustably threaded in the lower ends of arms 17 and 18. These cam bolts have tapered inner ends adapted to engage cam surfaces 25 and 26 formed on the underside of governor lever 7 whereby during increasing speed of the engine the compression of spring 16 is released by pin 23 engaging cam surface 25 to raise governor lever 7. Conversely, when the engine speed is being reduced by movement of hand lever 10 in the opposite direction, then stop 19 will engage the right hand side of stop 20, Fig. 2, and accordingly cause spring 15 to be compressed until lever 7 is released by engagement of cam bolt 24 with cam surface 26. The released stored-up energy in spring 15 will then suddenly shift governor lever 7 past the critical speed position. Broadly, stop 20 and projection 19 constitute a releasable latch in which projection 19 is an axially movable portion or element carried by or formed as a part of the manual lever.

From the foregoing disclosure it is seen that the operator is unable to operate the engine at a predetermined speed such as the critical speed and this is accomplished without causing the operator to stop movement of hand lever 10 thereby giving him the feel of continuous speed control without incurring the objections of operating at the critical speed or of slowly passing through the same.

In addition to the foregoing operations an idle stop pin 27, Fig. 1, may be placed in the path of movement of lever 10 by projecting upwardly through a suitable opening in quadrant 12. In order to stop the engine it is necessary to lower this pin whereupon lever 10 may then be moved against stop pin 28. To lower idle pin 27 it is pivotally connected as at 29 to a lever 30 while a spring 31 normally biases pin 27 to its upper idle position. Hence to stop the engine it is only necessary for the operator to lift lever 30, Fig. 1, thereby lowering pin 27 and then move hand lever 10 against stop lever 28. If it is desired to compel governor lever 7 to quickly follow hand lever 10 except at the critical speed, a pin 32, Fig. 1, slidably extends through governor lever 7 and into an opening 34 in lever 10. The lower end of pin 32 rests upon a stationary cam surface 33 whose low point occurs at the critical speed position thereby allowing the pin to fall out of opening 34 and thereby permit governor lever 7 to be controlled by the stop lugs. When lever 7 is on either side of the critical speed position then cam 33 will move pin 32 upwardly into aligned opening 34 to make the governor lever 7 and hand lever 10 operate as a positive unit.

From the foregoing disclosure it is seen that we have provided a critical speed controller that is relatively simple in construction, operation and maintenance and yet is positive and foolproof and completely removes from the control of the operator any possibility of running the engine at a critical speed while at the same time permitting him to have the feel of smooth continuous control. In addition to the foregoing, the device is compact and rugged combined with a high degree of sensitivity of control and flexibility of operation.

It will of course be understood that various changes in detail of construction and arrangement of parts may be made by those skilled in the art without departing from the spirit of the invention as set forth in the appended claims.

We claim:

1. A controller comprising, in combination, a control member, manual means, means whereby said control member is adapted to move simultaneously with the movement of said manual means in either direction of movement throughout a predetermined range and yet allow relative movement between the control member and manual means during a portion of the movement of the latter intermediate of said predetermined range, means for controlling said control member as it approaches said intermediate portion so that continued movement of the manual means is not transmitted to said control member, and means for releasing said latter means so as to allow said control member to have said simultaneous movement with the manual means on either side of said intermediate portion after the manual means has passed therethrough.

2. A controller comprising, in combination, a control member, manual means, means for moving said control member simultaneously with said manual means through a predetermined range and for moving said control member more rapidly than the movement of said manual means through an intermediate portion of said range, and means for controlling said control member so that the manual means can move through said predetermined portion in either direction relative to said control member and after passing therethrough the control member can have its rapid movement through said intermediate portion and thereafter move simultaneously with the control member.

3. A controller comprising, in combination, a control member, means for actuating said control member so that it follows simultaneously the movement of said manual means in either direction throughout a predetermined range of operating conditions, and means for preventing movement of said control member during another predetermined operation of said actuating means and for releasing said control member to allow it to move continuously through a predetermined extent until it is subject to further actuation by said actuating means.

4. An engine speed controller comprising, in combination, means adapted to adjust the speed of an engine, operating means for said adjusting means, means for interconnecting said operating means and said adjusting means, whereby the operating means is adapted to be continuously operable throughout its range at all time, and mechanism for preventing said adjusting means from establishing a fixed adjustment at a critical engine speed even though said operating means is movable through a position that would normally produce said critical engine speed.

5. A controller comprising, in combination, a pair of cooperating levers one of which is manually operated, means for positively locking said levers together so that the second lever is directly actuated by said manual lever and for releasing said positive lock when said levers reach a predetermined position in their operation, means for preventing a predetermined movement of said second lever while movement of the manual lever continues, means for releasing said second lever after it is prevented from moving, and means for causing said second lever to move rapidly when released.

6. A controller comprising, in combination, a manual lever, a second lever, means for positively locking said levers together so that the second one is subject to direct actuation by the manual lever and has movement substantially identical thereto, means for unlocking said levers automatically at a predetermined position thereof, means whereby upon unlocking of said levers they are adapted automatically in response to a predetermined continued movement of said manual lever to have relative movement between each other, and means whereby said relative movement is at a different rate than the movement of the manual lever.

7. A controller comprising, in combination, a manual lever, a second lever, means for positively locking said levers together so that the second one is subject to direct actuation by the manual lever and has movement substantially identical thereto, means for unlocking said levers automatically at a predetermined position thereof, means whereby upon unlocking of said levers they are adapted automatically in response to a predetermined continued movement of said manual lever to have relative movement between each other, and means whereby said relative movement is at a different rate than the movement of the manual lever in either direction of operation of said manual lever.

8. A controller comprising, in combination, a shaft, a control lever rigidly secured thereto and having an outer movable end, a pivotally mounted manual lever having a pair of projections extending along each side of said control lever, springs interposed between said projections and said control lever whereby movement of said manual lever is adapted to transmit movement through said springs to said control lever, a latch mechanism adapted to prevent movement of said control lever during a predetermined position thereof, and means for releasing said latch to allow spring actuation of said control lever.

9. A controller comprising, in combination, a governor control shaft, a control lever secured thereto to rotate the same, a manual lever freely journalled on said shaft, yieldable means connecting said levers whereby movement may be transmitted from the manual lever to the control lever through said yieldable means, latching mechanism for interrupting movement of said control lever while still allowing movement of said manual lever thereby subjecting said yieldable means to an increasing force, and means for releasing said latching mechanism to allow said control lever to be quickly moved by said yieldable means.

10. A controller comprising, in combination, a governor control shaft, a control lever secured thereto to rotate the same about its axis and having an axially movable portion, a manual lever pivoted for movement independently of said control lever, yieldable means connecting said levers to transmit movement from the manual lever to the control lever, a stop element engageable with the movable portion of said control lever so as to interrupt movement thereof while still allowing movement of said manual lever, and means for raising said axially movable portion of said control lever thereby releasing engagement of said stop element and allowing movement of said control lever by said yieldable means.

11. A controller comprising, in combination, a shaft, a control lever secured to said shaft to angularly adjust the same, a manual lever adapted to have pivotal movement independently of said control lever, yieldable means interposed between said levers, stop elements one of which is carried by said control lever so as to interrupt movement thereof at a predetermined position, and means for effecting relative movement between said stop elements to release the same and allow said control lever to be moved by said yieldable means.

DANA R. STAPLES.
CARL A. RUCKERT.